United States Patent [19]

Tanaka

[11] Patent Number: 5,588,135
[45] Date of Patent: Dec. 24, 1996

[54] DATA PROCESSING DEVICE IN A VIRTUAL MEMORY HAVING A PAGING FUNCTION

[75] Inventor: Takehiko Tanaka, Kawasaki, Japan

[73] Assignee: Fujitsu Limited, Kawasaki, Japan

[21] Appl. No.: 133,220

[22] Filed: Oct. 7, 1993

[30]    Foreign Application Priority Data

Oct. 7, 1992  [JP]  Japan ..................... 4-268325

[51] Int. Cl.⁶ .................................................. G06F 12/06
[52] U.S. Cl. ............................................ 395/487; 395/486
[58] Field of Search ...................... 395/425, 400, 395/486, 487, 415, 460, 468, 463

[56]          References Cited

U.S. PATENT DOCUMENTS 4,035,778  7/1977  Ghanem ................................. 395/650
  5,155,834  10/1992  Ryan et al. ............................. 395/415

*Primary Examiner*—Eddie P. Chan
*Assistant Examiner*—Kevin L. Ellis
*Attorney, Agent, or Firm*—Staas & Halsey

[57]          ABSTRACT

A data processing device carries out a paging method used when a virtual memory methods is employed. First, among the pages stored in a main memory, flag is set in a page which has been referred to. The flag is examined at equal time intervals and the elapse time after the page was last referred to is measured. The elapsed time is summarized for the entire pages and the number of pages having the same elapsed time is counted. Calculation is carried out in advance to know up to which page group are to be paged out starting with the page group with the longest elapsed time to satisfy the number of pages requested by a CPU when a page fault occurs. The reference elapsed time thus calculated and the elapsed time of each page are compared and pages with elapsed times longer than the reference are paged out.

14 Claims, 11 Drawing Sheets

FIG.2

| Page flame | LRU COUNTER VALUE | SEIZURE INHIBITION FLAG | REFERENCE FLAG |
|---|---|---|---|
| Page 1 | (1) 2 | 0 | (0) 0 [1] |
| Page 2 | (0) 1 | 0 | (0) 0 |
| Page 3 | (5) 0 | 0 | (1) 0 |
| Page 4 | (2) 3 | 0 | (0) 0 |
| Page 5 | (4) 0 | 0 | (1) 0 [1] |
| Page 6 | (2) 3 | 0 | (0) 0 |
| Page 7 | (5) 5 | 0 | (0) 0 |
| Page 8 | (3) 0 | 0 | (1) 0 [1] |
| Page 9 | (3) 4 | 0 | (0) 0 |
| Page 10 | (4) 5 | 0 | (0) 0 |
| Page 11 | (3) 4 | 0 | (0) 0 [1] |
| Page 12 | (2) 0 | 0 | (1) 0 |
| Page 13 | (0) 1 | 0 | (0) 0 |
| Page 14 | (1) 2 | 0 | (0) 0 [1] |
| Page 15 | (2) 3 | 0 | (0) 0 |
| Page 16 | (0) 1 | 1 | (0) 0 |

FIG.4

| LRU COUNTER VALUE | NUMBER OF PAGES |
|---|---|
| 0 | $X_0$ (4) |
| 1 | $X_1$ (3) |
| 2 | $X_2$ (2) |
| 3 | $X_3$ (3) |
| 4 | $X_4$ (2) |
| 5 | $X_5$ (2) |

FIG.5

| LRU COUNTER VALUE | NUMBER OF PAGES CORRECTED |
|---|---|
| 0 | $Y_0$ (2) |
| 1 | $Y_1$ (1) |
| 2 | $Y_2$ (2) |
| 3 | $Y_3$ (0) |
| 4 | $Y_4$ (1) |
| 5 | $Y_5$ (0) |

DATA PROCESSING DEVICE IN A VIRTUAL MEMORY HAVING A PAGING FUNCTION

BACKGROUND OF THE INVENTION

The present invention relates to a data processing device used in the virtual memory method which is one of memory control methods for computer systems. This data processing device is used where a paging system is employed to implement the virtual memory method.

A paging system is a system as described below. A program and/or, data and a storage region of a main memory are each divided into sections having the same size. The unit to which the program and/or data are divided is referred to as a page, and the unit to which the storage region is divided is referred to as a page frame. When the program is executed by a CPU, necessary pages are first loaded from an external memory into page frames in the main memory (page-in) and are executed. Thereafter, if any necessary page exists in a page frame in the memory, the page is executed as it is. Conversely, if there is no necessary page in the page frames in the main memory (this state is referred to as "page fault"), after any page on the main memory is shifted to the external memory (page-out), necessary pages are shifted from the external memory into the main memory (page-in) and are executed. Such page-in and page-out operations are referred to as paging.

As a logic for selecting pages to be paged out, an LRU (last-recently-used) paging process is used Wherein pages which are less frequently referred to are paged out. On the other hand, the increasing demands for computer systems having higher speeds in recent years call for a paging system with less overhead. Therefore, there is a need in the art to improve the LRU paging system in order to construct data processing devices which allow paging at higher speeds.

The present invention relates to such a data processing device for performing paging at a high speed.

FIG. 12 shows a conventional configuration for LRU paging.

In FIG. 12, a storage region of a main memory 110 is divided into a plurality of page frames 110a. Pages that constitute a program or data are loaded for each of the page frames 110a. Each of the page frames 110a has a flag region 110b wherein a reference flag indicating whether the page written therein has been referred to and a seizure inhibition flag indicating that the page is a page which cannot be seized from the page frame 110a are set and has an LRU counter region 110c for keeping a counter value indicating the time period during which the page written therein has not been referred to.

In association with the main memory 110 having such a configuration, there are provided a memory access monitoring mechanism 111 implemented with hardware, an LRU counter setting section 112 implemented with software, a seizable page judging section 113 implemented with software and a page contents saving section 114 implemented with software.

When a page is referred to, the memory access monitoring section 111 sets a reference flag in the page 110a corresponding to the page referred to.

The LRU counter setting section 112 has a timer. Each time the timer reaches a defined period, the LRU counter setting section 112 scans each of the page frames 110a and detects whether there is a reference flag or not. According to the state of reference flag setting, the LRU counter setting section 112 rewrites the counter value kept in the LRU counter region 110c to increment it if the page written in the page frame scanned has not been referred to. On the other hand, if the page written in the page frame scanned has been referred to, the LRU counter setting section 112 clears the counter value kept in the LRU counter region 110c and clears the reference flag. When a page fault occurs, the seizable page judging section 113 judges the page to be seized on the basis of the counter value thereof. The page contents saving section 114 pages out the page which has been seized to the external memory.

In this conventional data processing device, in order to judge the page to be seized, the seizable page judging section 113 first scans the LRU counter value and reference flag of each page. If there is a page having the maximum LRU counter value among all pages stored in the main memory 110, the seized page judging section 113 judges such a page to be seized provided that it is a page which is seizable. An seizable page as used here means a page wherein a reference flag as described above is not found to be set during the reference made to scan the LRU counter value and is an object for referring by its nature on the contrary, a page which is not an object for referring by its nature is such as a page at an area wherein an I/O device is in unsynchronous connection with a CPU. For such a page which is not to be referred to by its nature, an seizure inhibition flag is set in advance.

Since paging is normally able to handle a plurality of pages at a time to increase processing speed, a CPU (not shown) issues a command directing to page out a plurality of pages together depending on the number of pages to be written. However, the seized page judging section 13 judges pages whose LRU counter values are equal to the preset maximum value to be objects of seizure in one cycle of scanning. Therefore, the required number of pages may not be acquired in one cycle of scanning. In this case, scanning is similarly repeated after the first scannning. This time, pages which have an LRU counter value smaller by one than the LRU counter value for the pages judged to be objects of seizure in the first process and which is seizable, are judged to be objects of seizure. If the requested number of pages can not be acquired in this scanning, the similar scanning is repeated further to judge pages which have an LRU counter value further smaller by one and which is seizable as objects of seizure. Conventional data processing devices employ a system wherein such a procedure is repeated to judge the requested number of pages as objects of seizure.

In this regard, a specific example will be described with reference to FIG. 2.

It is assumed for FIG. 2 that particular numerical values are kept in the flag region 110b and the LRU counter region 110c of the main memory 110. It is assumed that this device is preset to page six pages at a time when a page fault occurs. The LRU counter value is assumed to be within the range from "0" to "5".

Assume that a CPU (not shown) accessed the main memory 110 and it was judged that a page fault occurred because there was no hit on the program or data required. In this case, the seized page judging section 113 is requested to page out 6 pages.

The seized page judging section 113 first examines all pages one by one to see whether their respective LRU count values are equal to "5" or not. In this cycle of scanning, only two pages, i.e., Page 7 and Page 10 are acquired as pages to be seized. However, the requested number of pages "6" has not been reached with the total number of the decided pages.

Next, the seized page judging section 113 examines all pages to see whether their respective LRU count values are equal to "4" or not. In this cycle of scanning, only one page, i.e., Page 9 is acquired as a page to be seized (Page 11 is excluded from objects of seizure because it has a reference flag set.). At this point, the total number of pages acquired is "3" but is still short of the requested number of pages of "6".

Then, the seized page judging section 113 examines all pages to see whether their respective LRU count values are equal to "3" or not. In this cycle of scanning, three pages, i.e., Page 4, Page 6 and Page 15 are acquired as pages to be seized. This brings about the total number of pages acquired "6", and the requested number of pages "6" is reached.

Thus, the requested number of pages "6" is finally acquired and it is now possible to perform page-out with the page contents saving section 114.

However, according to the conventional art wherein scanning is performed through the LRU counter values one by one in the order of decreasing values, it takes a long time to judge the pages to be seized. Scanning is performed on the LRU counter value of each page in the order of decreasing values even when the distribution of the LRU counter values is biased toward lower values. As a result, the time required for judging the pages to be seized becomes especially long.

In the worst case, the scanning of the LRU counter values of all pages must be repeated from the maximum value to the minimum value of the LRU counter values.

SUMMARY OF THE INVENTION

It is an object of the present invention to provide a data processing device having a paging function which allows judgement of pages to be seized at a high speed.

In order to achieve the above object, the data processing device having a paging function according to the present invention is a data processing device wherein a storage region of a memory is divided into a plurality of page frames; some pages formed by dividing a program and/or data are written in the page frames and the remaining pages are written in an external memory; page-out is performed when a required page has not been written in the memory to move any one of the pages written in the memory to the external memory; and, thereafter, page-in is performed to write a required page written in the external memory to the memory characterized in that it comprises a measuring means for measuring the elapsed time after each of the plurality of pages stored in the memory was last referred to, a page counting means for counting the number of the pages in each group of pages for which the elapsed time is the same, a reference elapsed time determining means for determining a reference elapsed time for pages to be paged out in advance on the basis of the results of the counting performed by the counting means when a page fault occurs, and a page-out judging means for comparing the elapsed time of each page with the reference elapsed time and for judging the pages to be paged out of which the elapsed time is greater than the reference elapsed time.

The present invention can be implemented in various modes as described below.

First, the memory may be a semiconductor memory; the memory region of the memory may be divided into a plurality of page frames; and each page may be written in each of the page frames. As the external memory, magnetic memories such as magnetic drums and magnetic tapes may be used.

Next, a page may be a part of a program or data which have been divided into pieces.

The measuring means may be provided by measuring the actual elapsed time with a clock which is mechanical or software-implemented. Alternatively, checking may be performed at equal time intervals to see whether a page has been referred to or not and the number of times the check is performed may be used as the elapsed time. The elapsed time measured by the measuring means may be written into the pages themselves stored in the memory. Alternatively, it may be listed on a table or the like provided separately from the memory. Further, a measuring means may be provided for each page. This measuring means may be adapted to clear the result of measurement on any page which has been referred to. Judgement whether a page has been referred to or not may be made by checking the flag which is set when the page is referred to or by using other means.

Next, the page counting means may be adapted to count only the number of the pages corresponding to each elapsed time. The page numbers of the pages corresponding to each elapsed time may be sorted into a group. The counting means may perform counting at timing the same as the timing at which the measuring means performs measuring. It can count at completely different timing. For example, counting may be started only after a page fault takes place.

When the number of pages in each of the groups are added in the order of decreasing number of pages from groups of longer elapsed times to groups of shorter elapsed times, the reference elapsed time determining means may be adapted to determine the reference elapsed time by checking the elapsed time of the group having pages the number of which, if added, will cause the total number of pages added to exceed the number of pages for which page-out is requested. A modification value may be added to or subtracted from this elapsed time to determine the reference elapsed time. Further, in determining the reference elapse time, pages which are by nature not subjected to page-out may be subtracted from the added value or may be excluded from the addition in advance. The number of such pages which are by nature not subjected to page-out may be used as it is or may undergo a predetermined operation such as averaging. Further, such pages which are excluded from addition in advance may be sorted according to their elapsed times and counted, the result being summarized on a table. The data may be written to this table at the same timing as that at which the counting means counts or at any unique timing. Especially, the writing to the table may be performed after a page fault takes place.

When the elapsed time of each page is greater than the reference elapsed time or when the former is equal to or greater than the latter, the judging means may judge the former as an object of seizure.

According to the present invention, the measuring means measures the elapsed time after each page stored in the memory was last referred to, and the number of pages for which elapsed time is the same is counted at certain timing. On the basis of the results of the counting, a reference elapsed time is determined in advance to be used as a threshold to define pages to be paged out when a page fault occurs. Each page is scanned according to the reference elapsed time thus determined. If the elapsed time of a page is longer than the reference elapsed time, the page is judged to be an object for page-out.

Since the pages to be seized are judged as described above, the data processing device according to the present invention does not need to scan the elapsed time of each page starting with the maximum value of the elapsed times. Specifically, each page may be scanned using an elapsed time shorter than the maximum value and pages whose elapsed times are longer than that may be judged to be objects of seizure. This substantially reduces the time required for judging the pages to be paged out.

Especially, in determining the reference elapsed time, on the basis of the number of groups each constituted by pages of the same elapsed time which has been counted in advance, the numbers of the pages in those groups are sequentially added from groups of longer elapsed times to groups of shorter elapsed times. When the result of the addition exceeds the number of pages requested to be paged out, the elapsed time of the group which has been last added is judged to be the reference elapsed time. This method ensures that, on the basis of the reference elapsed time, the page-out judging means judges the pages to be paged out in accordance with the requested number of pages in only (almost) one cycle.

Further, the count value of the number of the examinations to see whether the pages are referred to or not which are carried out at equal intervals may be used as the elapsed time. When the addition is carried out, it can be carried out based on the data registered in a distribution data table showing the numbers of pages at the respective same count value and the data registered in a correction data table showing the numbers of unseizable pages (pages which cannot be paged out) at the respective same count value. In this case, the greatest count value is identified such that the result value which is obtained by adding the difference values between the data registered in the distribution data table and the correction data table of each same count value starting with the difference value of the maximum count value becomes greater than the requested number of pages. This greatest count value is determined as an object-of-seizure (page-out) counter value. Each page is then scanned on the basis of the object-of-seizure (page-out) counter value.

Thus, the object-of-seizure (page-out) counter value can be determined taking pages which can not be seized into consideration in advance and the pages to be paged out can be judged accordingly. As a result, the pages to be paged out can be judged at a higher speed compared with the conventional art.

With the above-described judgement logic, pages to be paged out are judged in the requested number of pages before each page is scanned completely. Therefore, there is a possibility that pages with larger counter values will not be judged to be objects of seizure. In order to solve this problem, the reference elapsed time determining means first identifies the greatest counter value such that the result value which is obtained by adding the difference values between the data registered in the distribution data table and the data registered in the correction data table of each same count value starting with the difference value of the maximum count value becomes greater than the requested number of pages. If the greatest counter value thus identified agrees with the maximum counter value, the greatest counter value identified is judged to be the LRU counter value of an object of seizure. If they do not agree, the value greater by one than the greatest counter value identified is judged to be the counter value of an object of seizure (page-out).

According to the determination of the object-of-seizure (page-out) counter value, the page-out object judging means scans each page to decide pages whose counter values are greater than the object-of-seizure (page-out) counter value and which are not set to be unseizable to judge them as objects of seizure.

Thereafter, the reference elapsed time determining means repeats this process of determination. In accordance with the object-of-seizure (page-out) counter value resulting from the process of determination, the page-out object judging means can reliably judge pages with greater counter values as objects of seizure with less scanning cycles compared with the prior art.

As described above, according to the present invention, pages to be paged out can be judged with less scanning cycles compared with the prior art when a page fault occurs,

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a table illustrating the example of the contents stored in a main memory 1' in FIG. 1.

FIG. 4 illustrates a distribution data table in FIG. 1.

FIG. 5 illustrates a correction data table in FIG. 1,

DESCRIPTION OF THE PREFERRED EMBODIMENT

Figure 1:
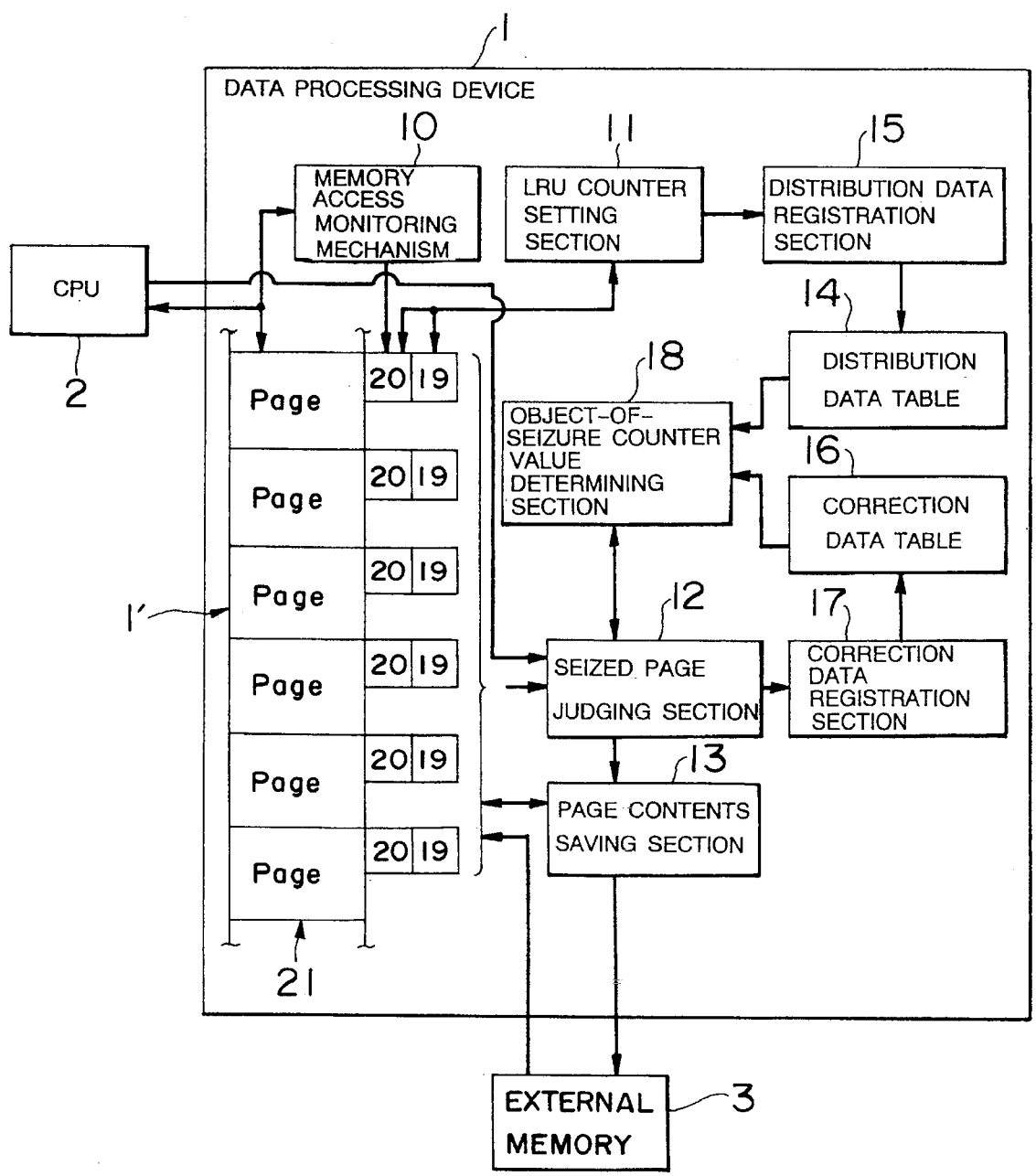
FIG. 1 is a block diagram of a data processing device of a first embodiment of the present invention.

The present invention will now be described with reference to preferred embodiments thereof.
First Embodiment A data processing device 1 according to the first embodiment having the overall configuration as shown in FIG. 1 has a main memory 1' which is accessed by a CPU (central processing unit) 2 of a computer. The main memory 1', is comprised of a semiconductor memory, along with an external memory 3 and constitutes a virtual memory which has a large capacity and allows high speed access.

Specifically, a program or data as a whole are stored in the external memory 3 comprised of a large capacity memory such as a magnetic memory and the program or data are divided into a plurality of parts, i.e., pages having same size. On the other hand, a storage region of the main memory 1' is divided into a plurality of regions, i.e., page frames 21 corresponding in size to the pages. The pages containing data or program which are frequently accessed by the CPU are written in the page frames 21 in advance to allow the data or program to be accessed at a high speed. (The situation that the data or program contained in a page is accessed by the CPU 2 is expressed "the page is referred to".).

When the page that the CPU has tried to refer to is not written in the main memory (this situation is referred to as "page fault"), among from the plurality of pages stored in each page 21, predetermined number of pages for which a long time has passed since they were last referred to are returned to the external memory 3 (this is referred to as "page-out"), and a plurality of pages including the page that CPU 2 has tried to refer to are moved from the external memory 3 to the page frame which has been paged out (this is referred to as "page-in"). "Paging" is accomplished through the above-described operations.

In the storage region of the main memory 1', flag regions 20 and LRU counter regions 19 are set in the same quantities as the page frames. The LRU counter regions 19 are regions for storing LRU count values corresponding to the elapsed times since the respective pages were last referred to. The flag regions 20 are regions for setting reference flags indicating the respective pages have been referred to and seizure inhibition flags indicating that the respective pages can be seized from the storage region.

FIG. 2 shows a specific example of the main memory 1' having the configuration as described above. In the present embodiment, it is assumed that the number of the page frames 21 is 16 and the LRU counter values are values from 0 to 5.

To perform various processes, connected to the main memory 1' having the above-described configuration are a memory access monitoring section 10 implemented with hardware, an LRU counter setting section 11 implemented with software, an seizure page judging section 12 implemented with software, and a page contents saving section 13 implemented with hardware. Further, a distribution data registration section 15 implemented with software is connected to the LRU counter setting section 11. A distribution data table 14 is connected to the distribution data registration section 15. A correction data registration section 17 is connected to the seized page judging section 12. A correction data table 16 is connected to the correction data registration section 17. The seized page judging section 12, distribution data table 14 and correction data table 16 are all connected to an object-of-seizure counter value determining section 18 which is implemented with software.

The memory access monitoring section 10 starts its operation by detecting when the CPU 2 has referred to any page. It sets a reference flag indicating that the page has been referred to after the LRU counter 19 was last updated in the flag region 20 corresponding to the page referred to.

The LRU counter setting section 11 includes a software timer. At timing defined by a predetermined cycle, the contents of the LRU counter regions 19 and flag regions 20 corresponding to the entire pages are scanned and it is checked whether a flag is set in each page. Pages with no reference flag have not ben referred to in the current cycle, so the count values written in the LRU counter regions 19 corresponding to those pages are incremented by one. Conversely, pages with a reference flag have been referred to in this cycle, so the count values written in the LRU counter regions 19 corresponding to those pages are reset to "0". Since the count values written in the LRU counters region 19 are updated in such a manner, the count values indicate the elapsed time since the respective pages were last referred to. Finally, the LRU counter setting section 11 clears all the reference flags to indicate that the LRU counter regions 19 have been updated.

The distribution registration section 15 receives the updated LRU counter values from the LRU counter setting section 11 and sorts them. The results are listed in the columns on the distribution data table 14 to show such values.

The distribution data table 14 manages the number of the pages for each LRU counter value. Specifically, as apparent from FIG. 4 showing the conceptual view of the distribution data table 14, the LRU counter values are divided into values from 0 to 5 in an "LRU counter value" columns. The number of the pages having each of the values thus divided as LRU counter values is listed in a "number of pages" column. Since the maximum value of the LRU counter values is "5" in the present embodiment, the distribution data table 14 manages, as shown in FIG. 4, the number $X_0$ of pages having the LRU counter value "0", the number $X_1$ of pages having the LRU counter value "1", the number $X_3$ of pages having the LRU counter value "3", the number $X_4$ of pages having the LRU counter value "4", and the number $X_5$ of pages having the LRU counter value "5".

Returning to FIG. 1, the correction data table 16 manages the number of the unseizable pages for each LRU counter value. The data registered in the correction data table 16 are referred to as correction data. As apparent from FIG. 5 showing the conceptual view of the correction data table 16, the LRU counter values are divided into values from 0 to 5 in the "LRU counter value" columns. The number of the pages which have each of the values thus divided as LRU counter values and which can not be seized from the storage region is listed in a "number of pages" column. Since the maximum value of the LRU counter values is "5" in the present embodiment, the correction data table 16 manages, as shown in FIG. 5, the number $Y_0$ of unseizable pages having the LRU counter value "0", the number $Y_1$ of unseizable pages having the LRU counter value "1", the number $Y_3$ of unseizable pages having the LRU counter value "3", the number $Y_4$ of unseizable pages having the LRU counter value "4", and the number $Y_5$ of pages having the LRU counter value "5".

When the seized page judging section 12 judges pages to be seized, the correction data registration section 17 measures the number of unseizable pages for each LRU counter value and registers it in the correction data table 16. Unseizable pages are pages for which seizure inhibition flag are set and pages for which reference flags are set because they have been referred to after the processing performed by the LRU counter setting section 11 immediately before the occurrence of a page fault. The pages with the seizure inhibition flag are by nature not object of paging. The pages with the reference flag have high probability of being referred to again. Therefore, they are both excluded from objects of seizure from the storage region.

The seized page judging section 12 is activated by a signal received from the CPU 2 when a page fault takes place. It then requests the object-of-seizure counter value determining section 18 to output the object-of-seizure counter values. The seized page judging section 12 sequentially scans the LRU counter values, reference flags and seizure inhibition flag corresponding to all the pages stored in the main memory 1' and judges pages to be seized on the basis of an object-of-seizure counter value (e) sent by the object-of-seizure counter value determining section 18. The object-of-seizure LRU counter value (e) is a value for judging the LRU counter values equal to or greater than it to be objects of seizure.

The seized page judging section 12 simultaneously judges whether each page is an unseizable page or not based on each flag and informs the correction data registration section 17 of the number of unseizable pages. The correction data is fed back for the determination of the object-of-seizure counter values performed by the object-of-seizure counter value determining section 18 during the next process of judging pages to be seized.

The object-of-seizure counter value determining section 18 is activated by the request for output of the object-of-seizure counter values made by the seized page judging section 12. The object-of-seizure counter value determining section 18 judges the LRU counter values to be seized that is the object-of-seizure counter value on the basis of the data registered in the distribution data table 14, the data registered in the correction data table 16, and the predetermined requested number of empty pages (the number of pages which are object of paging when a page fault occurs.)(It is assumed to be "6" in the present embodiment.).

The operation of the data processing device 1 having the above-described configuration will now be described with reference to the flow chart. For convenience in explanation, the specific values shown in FIG. 2 for LRU counter values, seizure inhibition flag, and reference flag, the specific values shown as examples in the distribution data table shown in FIG. 14, and the specific values shown as examples in the correction data table 14 shown in FIG. 5 are used.

Figure 3:
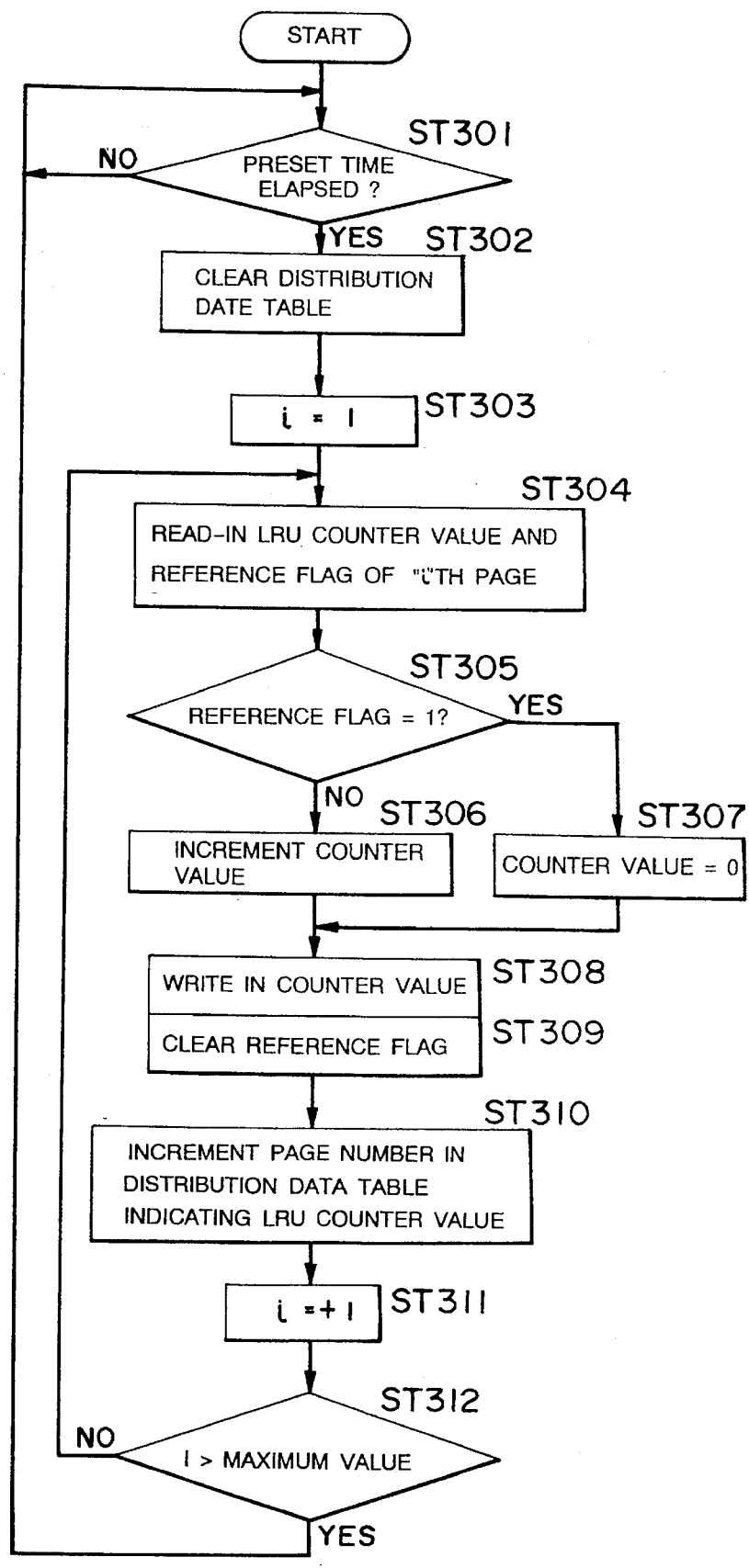
FIG. 3 is a flow chart for a process performed by an LRU counter setting section 11 and a distribution data registration section 15 in FIG. 1.

The process executed by the LRU counter setting section 11 and the distribution data registration section 15 before a page fault takes place will be first explained with reference to the flow chart in FIG. 3.

This process is started at the same time when the operation of the data processing device 1 as a whole is started. At step ST301, the process waits until a preset time defined as a scanning cycle elapses. When the preset time has elapsed, the distribution data registration section 15 is activated to clear the contents of the distribution data table 14 (step ST302) and a variable i corresponding to the frame numbers of the page frames 21 is set to "1" (step ST303).

Next, step ST304 reads in the LRU counter value stored in the LRU counter region 19 and the reference flag stored in the flag region 20 corresponding to the page written in the first page frame 21 (i=1).

Next, it is checked whether the reference flag is set (step ST305). If the reference flag is not set, the LRU counter value is incremented by one (step ST306). If the reference flag is set, the LRU counter value is reset to "0" (step ST307).

In either case, the updated LRU counter value is written in the original LRU counter region thereafter (step ST308) and, at the same time, the reference flag set in the flag region is cleared (step ST309).

Next, the distribution data table is activated, and a numerical value X in a "number of pages" column on the distribution data table 14 corresponding to the updated LRU counter value is incremented by one (step ST310).

Finally, i is incremented by one at step ST311. The steps ST304 through ST311 are carried out for each page and, when i exceeds the maximum value ("16" in the present embodiment), the process returns to step ST301 (step ST312).

One cycle of the process is thus completed and, at step ST301, the process waits for the preset time to elapse again. In such a manner, data are updated at equal intervals.

As a result of the above-described process, the LRU counter values and reference flag which had the values shown inside the parentheses ( ) in FIG. 2 immediately before the process fault occurred will have the values shown outside the parentheses in FIG. 2 after the process. The seizure inhibition flag is not rewritten by the process. The values registered in the distribution data table 14 are as shown as examples in FIG. 4.

Next, the processes performed by the seized page judging section 12 and the correction data registration section 17 when a page fault occurs will now be described with reference to FIG. 6. Similarly, the process performed by the object-of-seizure counter value determining section 18 will be described with reference to FIG. 7. The two processes are performed in parallel in mutual synchronization. Therefore, both processes will be described in parallel following the passage of time.

Figure 6:
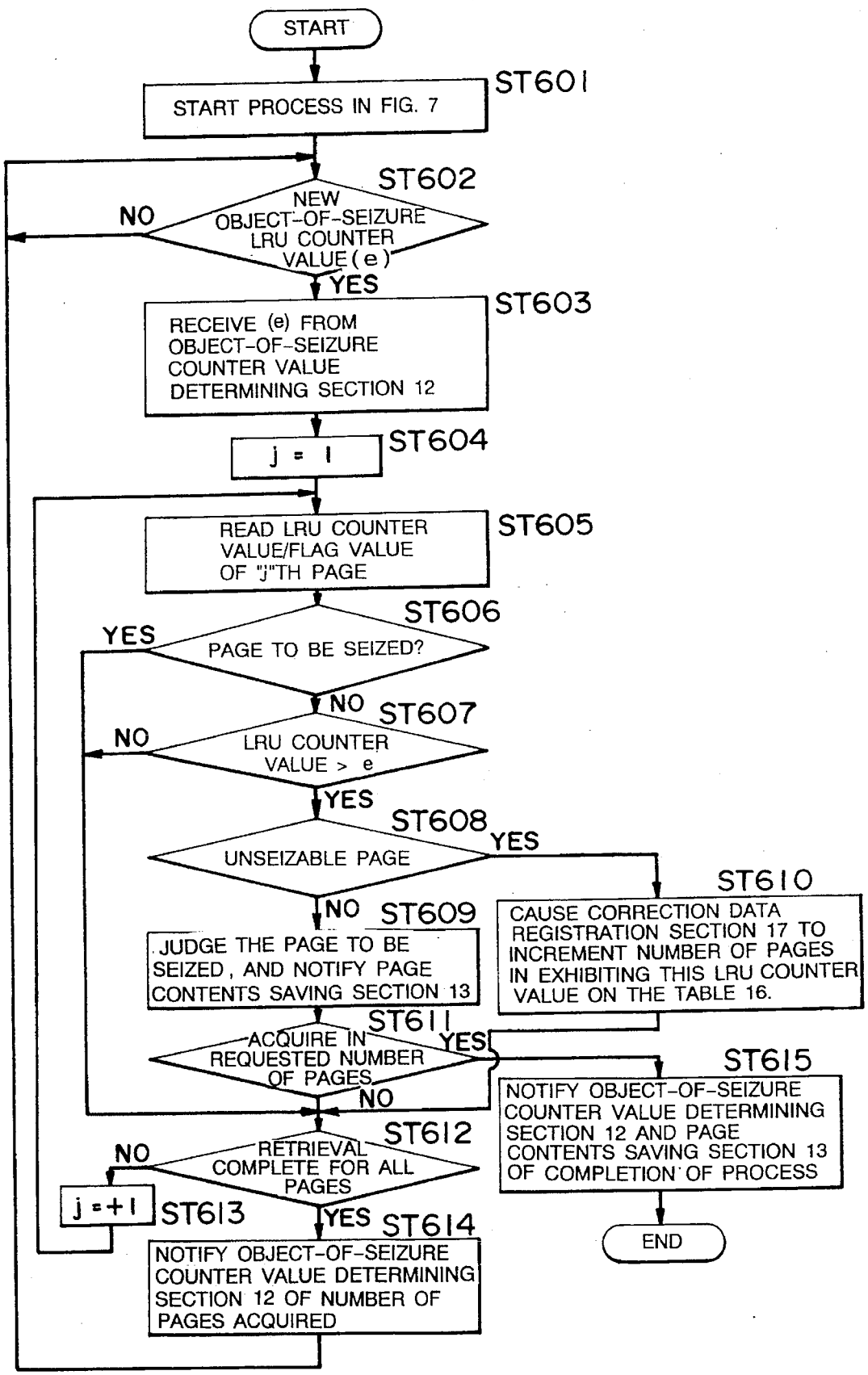
FIG. 6 is a flow chart of a process performed by a seized page judging section 12 in FIG. 1.

The process shown in FIG. 6 starts when a page fault takes place. The description is on the assumption that the LRU counter values and seizure inhibition flag has values shown outside the parenthesis "()" and the bracket "[]" and that reference was made to a plurality of pages after the completion of the preceding cycle as in FIG. 3 and before the page fault takes place. Therefore, it is also assumed that, in the flag regions corresponding to those pages, the values are set as shown inside the brackets "[]" in FIG. 2.

Figure 7:
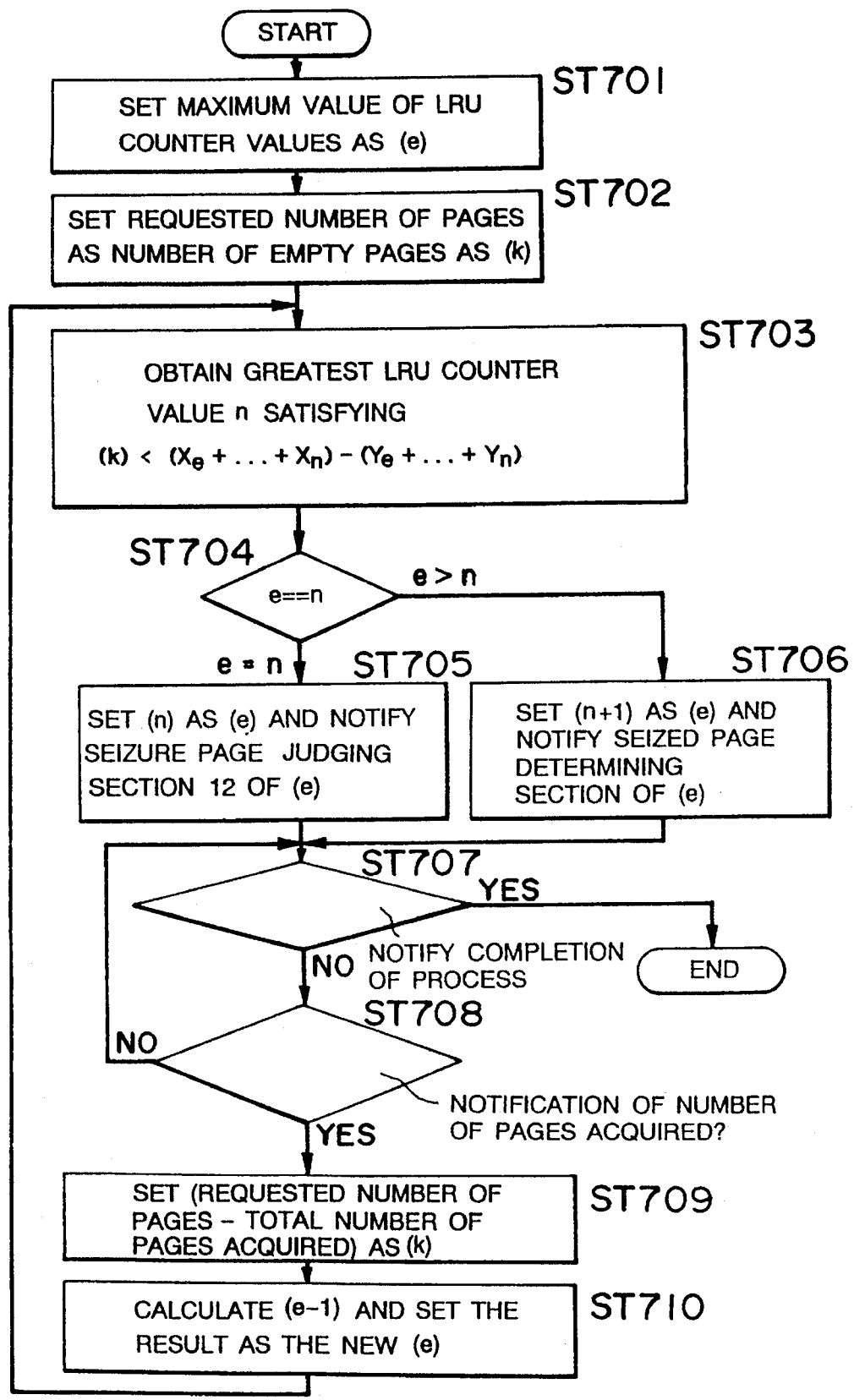
FIG. 7 is a flow chart of a process performed by an object-of-seizure counter value determining section 18 in FIG. 1.

First, the seized page judging section 12 causes the object-of-seizure counter value determining section 18 to start the process as shown in FIG. 7 as indicated at step ST601 in FIG. 6. The seized page judging section 17 waits at step ST602 for the object-of-seizure counter value determining section 18 to notify it of a object-of-seizure counter value (e).

The object-of-seizure counter value determining section 18 which has been thus caused to start the process shown in FIG. 7 first tentatively sets the maximum LRU counter value ("5" in the present embodiment) as the object-of-seizure counter value (e) at step ST701.

Next, the object-of-seizure counter value determining section 18 sets the requested number of empty pages which has been defined in advance ("6" in the present embodiment) as the short number of pages (k) which is a variable showing the short number of page that is object of paging to satisfy the requested number at step ST702.

Next, the object-of-seizure counter value determining section 18 refers to the management data $X_1$ of the distribution data table 14 and the management data $Y_1$ of the correction data table at step ST703 to obtain the greatest LRU counter value (n) (e≦n) which satisfies:

the short number of pages $(k)<(X_e+ \ldots X_n)-(Y_e+ \ldots +Y_n)$ However, when the process first enters this step after a page fault occurs, the management data $Y_1$ of the correction data table are all "0" since the number of pages to satisfy the request is set to "6", the present embodiment results in (n)="2" according to the management data Xi shown in FIG. 4. Since actual values are written in this correction data table (n) reflecting such values will be obtained during the first cycle of this process in and after a second cycle of the process.

At step ST704, the object-of-seizure counter value determining section 18 compares the object-of-seizure LRU counter value (e) and the greatest LRU counter value (n). When (e) equals to (n), the object-of-seizure counter value determining section 18 proceeds to step ST705 to reset the object-of-seizure LRU counter value (e) to (n) and notify the seized page judging section 12 of (e). On the other hand, when e>n, it proceeds to step ST706 to reset the object-of-seizure LRU counter value (e) to (n+1) and notify the seized page judging section 12 of (e) (In the present embodiment, since (e)="5" and (n)="2", e>n. Therefore, step ST706 results in (e)=(n+1)=2+1="3".).

After notifying the seized page judging section 12 of the object-of-seizure LRU counter value (e) in such a manner, the object-of-seizure counter value determining section 18 waits for notification of the completion of the operation of the seized page judging section 12 or notification of the number of pages newly acquired as object of seizure at steps ST707 and ST708.

With the notification of the object-of-seizure LRU counter value (e) from the object-of-seizure counter value determining section 18 (steps ST705 and ST706), the seized page judging section 12 exits the process at step ST602 and receives the object-of-seizure LRU counter value (e) as shown in FIG. 6.

Then, the seized page judging section 12 sets the variable (j) corresponding to the frame number of the page frame 21 to an initial value "1" at step ST604.

Next, the seized page judging section 12 reads in the LRU counter value, reference flag and seizure inhibition flag of the page in the "j"th page frame at step ST605.

At step ST606, the seized page judging section 12 checks whether the page in the "j"th page frame has already been identified to be an object of seizure and, if so, the process proceeds to step ST612.

If it is judged the page has not been identified to be an object of seizure at step ST606, the seized page judging section 12 checks whether the LRU counter value of the page in the "j"th page frame is greater than the object-of-seizure LRU counter value (e) at step ST607 and, if the LRU counter value (e) is equal to or smaller than the object-of-seizure LRU counter value (e), the process proceeds to step ST612.

If it is judged at step ST607 that the LRU counter value of the page is greater than (e), the seized page judging section 12 checks whether the page in the "j"th page frame is an unseizable page at step ST608. Specifically, it is judged that the page is an unseizable page if either the reference flag value or the seizure inhibition flag value read in at step 2 indicates a value "1".

If it is determined at step ST608 that the page is an unseizable page, the process proceeds to step ST610. The seized page judging section 12 notifies the correction data registration section 17 of the LRU counter value of the unseizable page and increments the number of pages exhibiting this LRU counter value on the correction data table 16 by one. Thereafter, the process proceeds to step ST612.

On the other hand, if it is judged at step ST608 that the page is not an unseizable page, the process proceeds to step ST609. The seized page judging section 12 judges the page in the "j"th page frame as a seizable page and notifies the page contents saving section 13 of such. The process then proceeds to step ST611.

At step ST611, the seized page judging section 12 checks whether the requested number of pages have been acquired as object of seizure or not as a result of the judgement of seizable pages at step ST609. If yes, the process proceeds to step ST615. At step ST615, the seized page judging section 12 notifies the object-of-seizure counter value determining section 18 and the page contents saving section 13 of the completion of the process. This terminates the process. If it is judged that the requested number of pages have not been acquired as object of seizure, the process proceeds to step ST612.

Unless it is judged at step ST612 that retrieval is complete for all the pages (16 pages in the present embodiment), the process returns to step ST605. At this point, the seized page judging section 12 increments the value of "j" at step ST613.

As described above, the seized page judging section 12 repeats the scanning process from step ST605 through step ST613 until the entire pages are retrieved.

When the retrieval is complete for the entire pages before the request number of pages are acquired as seizable pages, the process proceeds from step S612 to step ST614. At step ST614, the seized page judging section 12 notifies the object-of-seizure counter value determining section 18 of the number of pages acquired as pages to be seized through the process so far. (In the present embodiment, since the object-of-seizure LRU counter value (e) is set as "3", pages 7, 9 and 10 are judged as pages to be seized. Therefore, the number of acquired pages notified to the object-of-seizure counter value determining section 18 is "3". On the other hand, pages 1, 5, 8, 11, 14 and 16 have a seizure inhibition flag or reference flag set, so they are judged to be unseizable pages. Therefore, the correction data table 16 is rewritten as indicated by the example shown in FIG. 5.

Then, the process returns to step ST602 again, and the seized page judging section 12 waits for the notification of a new object-of-seizure LRU counter value (e) from the object-of-seizure counter value determining section 18.

The seized page judging section 12 judges seizable pages by carrying out the process flow shown in FIG. 6 as described above. When the requested number of pages have been acquired as object of seizure, it notifies of such at step ST615. On the other hand, if the requested number of pages are not acquired, it notifies the number of pages acquired at step ST614. The object-of-seizure counter value determining section 18 judges at steps ST707 and ST708 whether there is the notification of either the completion of process from the seized page judging section 12 or the number of pages acquired. When notified of the completion of the process, the object-of-seizure counter value determining section 18 terminates the process. On the other hand, when it receives the number of pages acquired, the object-of-seizure counter value determining section 18 proceeds to step ST709.

At step ST709, the object-of-seizure counter value determining section 18 calculates the sum of the numbers of the acquired pages notified so far and calculates;

Short number of pages (k)=requested number of pages− total number of the pages acquired.

The value thus calculated is set as the new number of pages short of request (k). (In the present embodiment, since the number of the pages acquired which was notified first is "3", the new number of pages short to satisfy the request (k) is (6−3)=3.).

The object-of-seizure counter value determining section 18 calculates (e−1) at the next step ST710, and the value thus calculated is set as a new object-of-seizure LRU counter value (e). (In the present embodiment, since the first (e) is "3", the new object-of-seizure LRU counter value (e) is set as (3−3) =2.).

Then, the process returns to step ST703 to repeat the above-described process. When the requested number of pages to be seized are finally acquired, the process shown in FIG. 6 terminates after step ST615 and, in response to this, the process shown in FIG. 7 terminates after step ST707. (In the present embodiment, the second cycle of step ST703 results in n=1. Therefore, it is judged that e>n at step ST704, and step ST705 sets (e)=(n+1)=2. According to this value, the process shown in FIG. 6 acquires Pages 4, 6, and 15 as pages to be seized. At step ST611 after the judgement of Page 15 as a page to be seized, it is judged that the requested number of pages to be seized have been acquired. Then, the process proceeds to step ST615 to notify the seizable page judging section 12 and the page contents saving section 13 of the completion of the process, terminating the process shown in FIG. 6.).

According to the page frame numbers for the pages to be seized notified as a result of the process as described above, the page contents saving section 13 moves the pages written in the main memory 1' to the external memory 3. Page-out is thus completed.

As described above, in the present embodiment, the object-of-seizure counter value determining section 18 determines the object-of-seizure LRU counter value (e) to notify to the seizable page judging section 12.

Thus, the object-of-seizure LRU counter value (e) is judged taking the distribution of the LRU counter values into consideration in the present embodiment. The pages having LRU counter values greater than the object-of-seizure LRU counter value (e) are regarded as objects of seizure. This allows the requested number of pages to be judged as object of seizure with smaller number of memory scanning processes compared with the prior art.

In addition, in the present embodiment, the object-of-seizure LRU counter value (e) is set as (n+1) when e>n at steps ST704 and ST706. Therefore, only one cycle of the process in FIG. 6 will not allow the requested number of pages to be acquired as object of seizure. Accordingly, even if the LRU counter values are biased toward the smaller values, it is possible to reliably judge a page having a big LRU counter value to be seizable in the first cycle of the process shown in FIG. 6.

Second Embodiment

If the object-of-seizure counter value is determined in accordance with the flow chart in FIG. 7 of the above first embodiment, it is assured that the seized page judging section 12 can judge seizable pages in the order of decreasing LRU counter values.

However, plural times of memory scanning processes are normally required in that embodiment.

Figure 8:
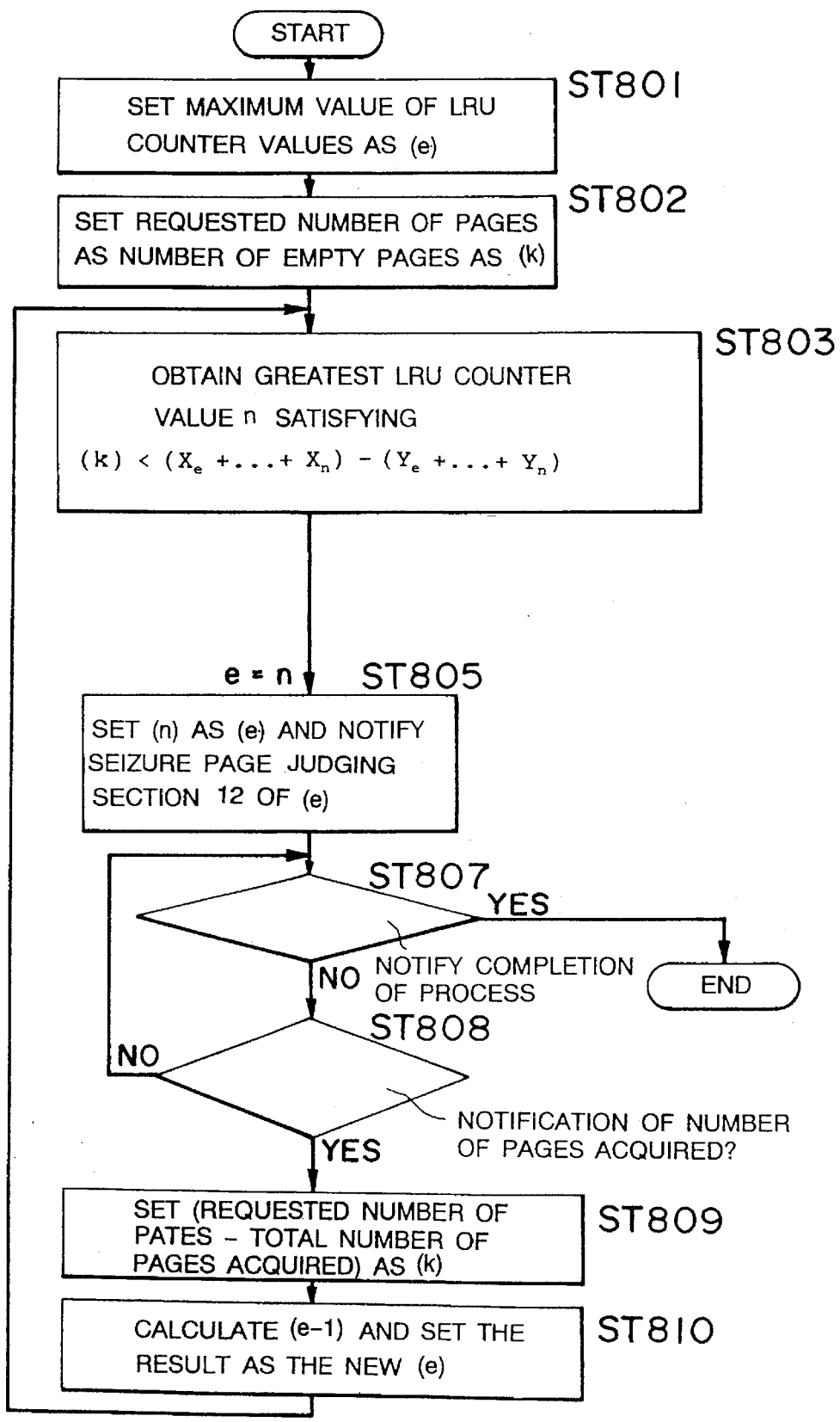
FIG. 8 is a flow chart of a process performed by an object-of-seizure counter value determining section 18 in a second embodiment of the present invention.

Taking this situation into consideration, the second embodiment of the present invention puts priority in reducing the number of times the memory scanning process is repeated and employs the process flow shown in FIG. 8 instead of the process flow shown in FIG. 7.

Specifically, the object-of-seizure counter value determining section 18 sets the maximum LRU counter value as the object-of-seizure LRU counter value (e) at step ST801. At step ST803, on the basis of the management data Xi of the distribution table 14 and the management data Yi of the correction data table 16, the greatest LRU counter value (n) is obtained, which satisfies:

the short number of pages $(k) < (X_e + \ldots + X_n) - (Y_e + \ldots + Y_n)$.

Then, at step ST805, the (n) is directly judged as a true seizable LRU counter value (e).

Using the object-of-seizure LRU counter value (e), the seized page judging section 12 can judge pages to be seized in one cycle of memory scanning process. (In the example shown in FIG. 2, e=2 can be set from the beginning, so the requested number of pages to be seized can be acquired in only one cycle of the scanning process shown in FIG. 6).

Since the present embodiment is identical to the first embodiment except the arrangement as described above, description is omitted for the rest.

Third Embodiment

The above-described embodiments disclose examples of arrangements wherein in determining the object-of-seizure LRU counter value (e), the latest correction data registered in the correction data table 16 are used as they are.

On the contrary, the present embodiment does not use the latest correction data as they are but uses correction data calculated by setting, for example, a weight ω and according to a formula:

$$(Y_i + Z_i \times \omega)/(1+\omega)$$

where $Y_i$ represents the latest correction data and $Z_i$ represents the correction data at the time when the previous page fault took place. Thus, the present embodiment uses a value obtained by changing the latest correction data according to the previous correction data.

Since the present embodiment is identical to the first embodiment except the arrangement as described above, description is omitted for the rest.

Fourth Embodiment

The above described embodiments disclose examples of an arrangement including the correction data table 16. On the contrary, the present embodiment has an arrangement wherein the object-of-seizure counter value determining section 18 determines the object-of-seizure LRU counter value based on only the data registered in the distribution data table 14.

Figure 9:
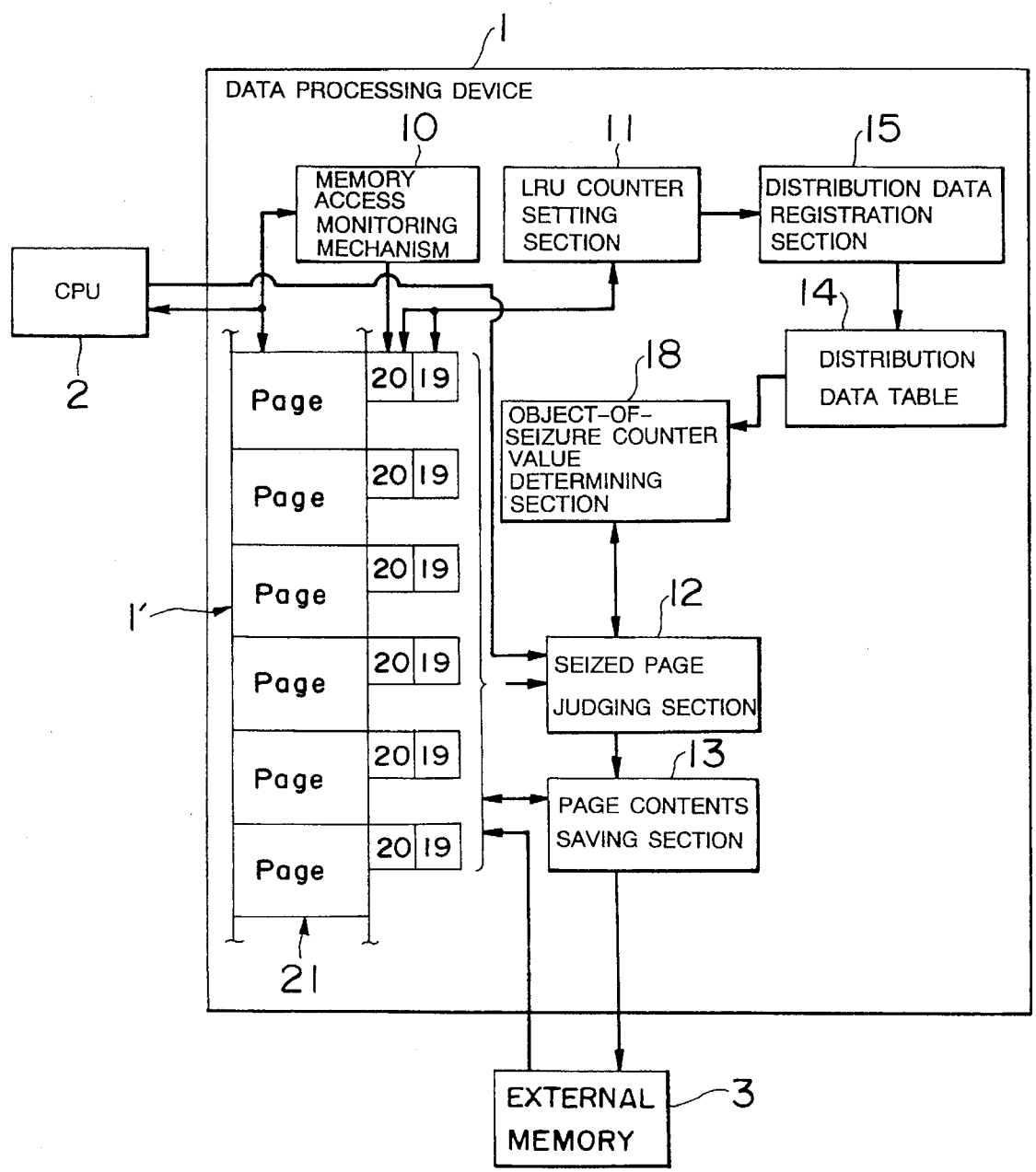
FIG. 9 is a block diagram of a data processing device of a fourth embodiment of the present invention.
Figure 10:
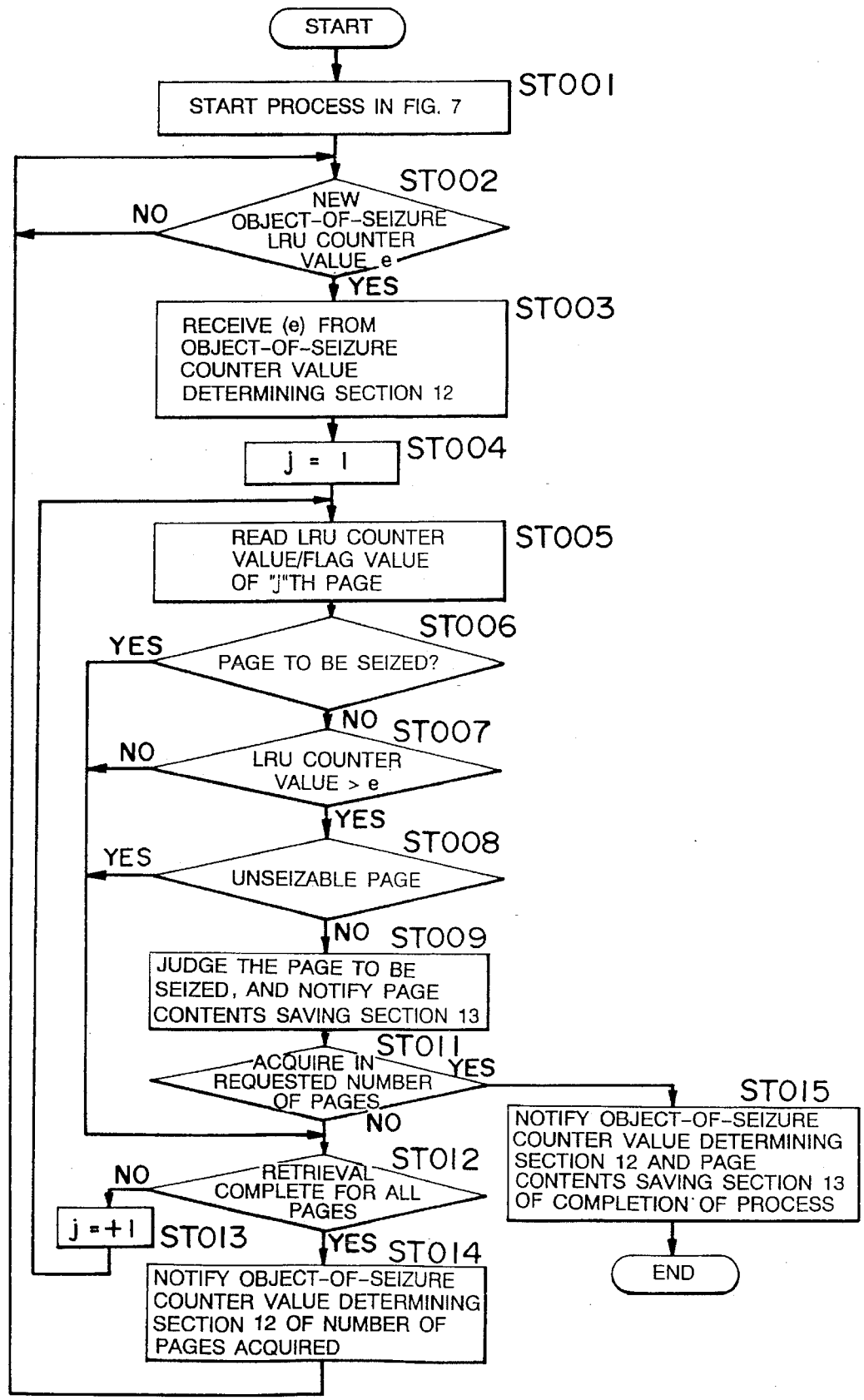
FIG. 10 is a flow chart of a process performed by an seized page judging section 12 of the fourth embodiment of the present invention.
Figure 11:
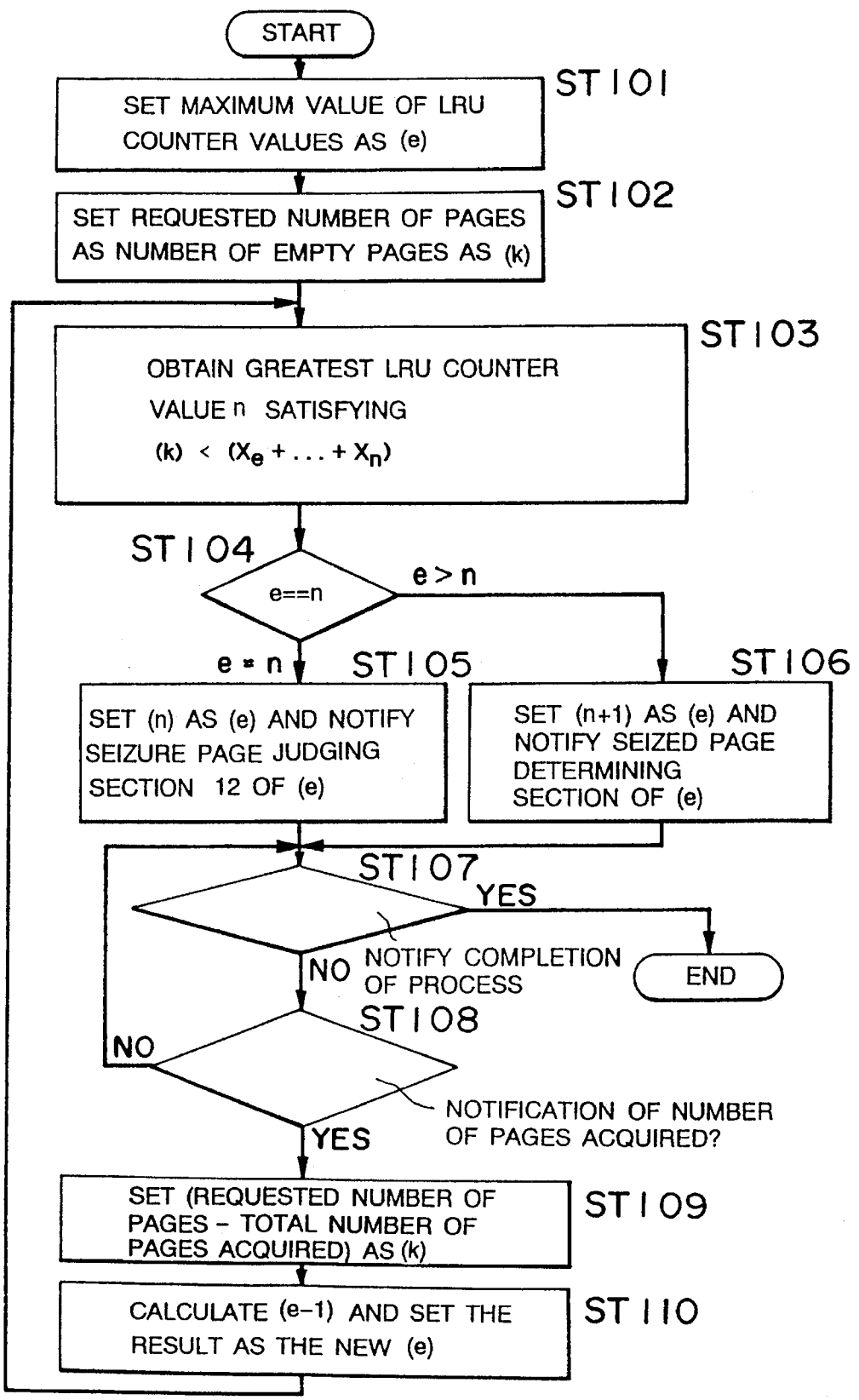
FIG. 11 is a flow chart of a process performed by an object-of-seizure counter value determining section 18 of the fourth embodiment of the present invention.
Figure 12:
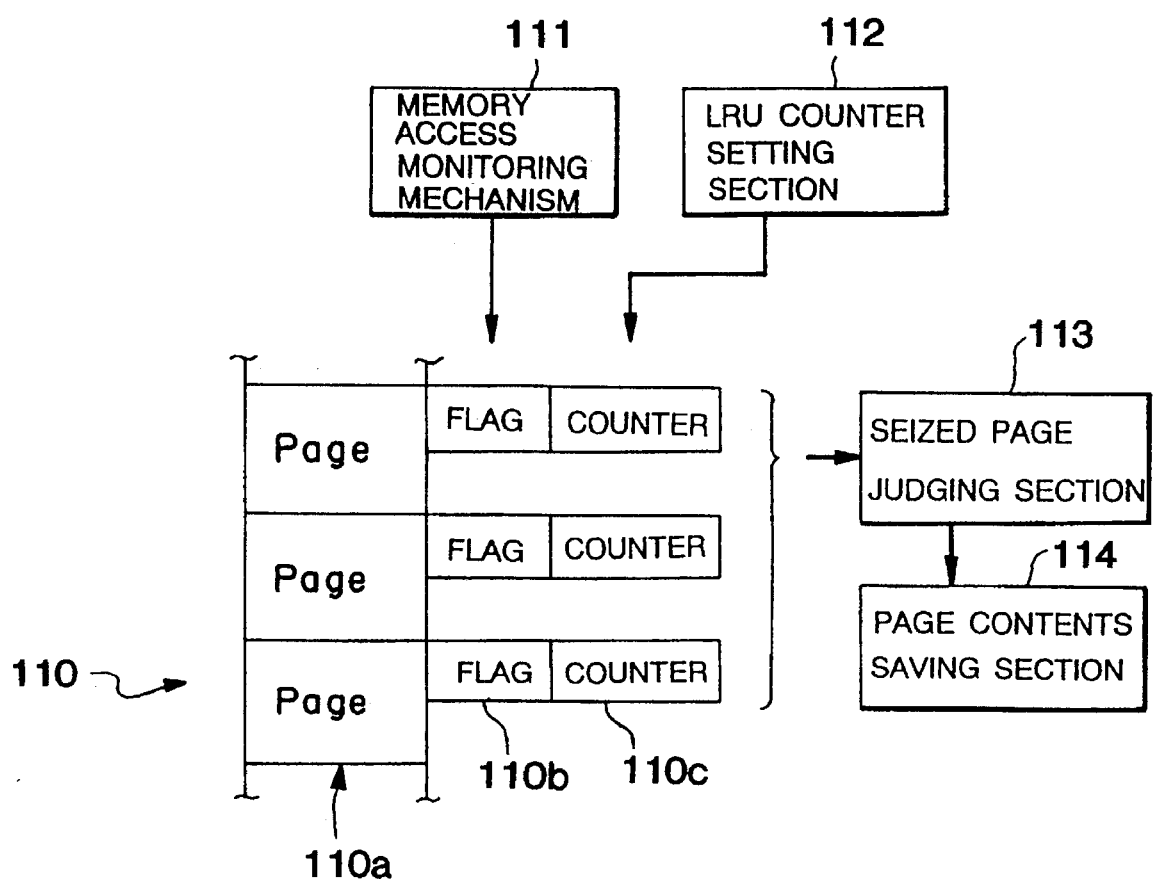
FIG. 12 is a conceptual diagram showing the prior art.

The present embodiment has an overall arrangement as shown in FIG. 9 instead of FIG. 1 for the first embodiment, employs the process as shown in FIG. 10 instead of the process of the seized page judging section 12 shown in FIG. 6, and employs the process as shown in FIG. 11 instead of the process of the object-of-seizure counter value determining section 18 shown in FIG. 7.

Specifically, the overall arrangement shown in FIG. 9 does not include the correction data table 16 and the correction data registration section 17 in FIG. 1.

Further, the process shown in FIG. 10 does not include step ST610 in FIG. 6. As a result, if it is judged at step ST008 that the page is as unseizable page, the process directly proceeds to step S012 (corresponding to step ST612 in FIG. 6).

In the process shown in FIG. 11, the process at step ST103 (corresponding to step ST703 in FIG. 3) is different from that in FIG. 7. Specifically, the greatest LRU counter value n which satisfies the following formula is obtained.

the short number of pages $(k) < (X_e + \ldots + X_n)$

The above arrangement eliminates the need for the correction data table 16.

Since the present embodiment is identical to the first embodiment except the arrangement as described above, description is omitted for the rest.

As described above, the present invention allows a significant reduction in the number of scanning processes on the entire memory required for a page out process in LRU paging to achieve a higher paging processing speed. This results in a reduction in the cost required for the paging function in a system with significant improvement in the performance of the system.

The above-described arrangements are only preferred embodiments of the present invention, and they may be modified by those skilled in the art to an extent that the principles of the present invention will not be violated.

For example, when a page in an unseizable state is measured at step ST615 in FIG. 6, instead of registering the value measured in the correction data table as it is, the number of pages obtained by averaging the value or by averaging the value with ratio considered may be registered in the correction data table 16.

Further, ">" may be changed to "≧" in the judgement at step ST607 in FIG. 6 and, at the same time, "<" may be changed to "≦" in the judgement at step ST703 in FIG. 7.

Having described and illustrated the principles of the invention in preferred embodiments thereof, it is apparent to those skilled in the art that the invention can be modified in arrangement and detail without departing from such principles. We therefore claim all modifications and variation coming within the spirit and scope of the following claim.

What is claimed is:

1. A data processing device having a paging function in which a main memory is divided into a plurality of page frames, a program is divided into pages of which size is the same as a page frame, page-out is performed when a required page is not written in the main memory, and, thereafter, page-in is performed to write a required page from an external memory into the main memory, comprising:

measuring means for measuring for every page stored in the main memory time elapsed since the page was last referred to;

grouping means for grouping the pages into page groups in which each page has the same elapsed time;

counting means for counting a number of pages in each group of pages;

adding means for adding the counted numbers for each of the groups, in order of decreasing the elapsed time for the group from longer elapsed time to shorter elapsed time, when a page fault occurs and some pages are requested to be paged-out;

referenced elapsed time determining means for determining a elapsed time for a group, adding of the counted number for which causes a result of the adding to exceed a number of requested pages to be paged-out, as a reference elapsed time for pages to be paged out; and means for comparing the elapsed time of each page with the reference elapsed time and for determining the pages in which the elapsed time is greater than the reference elapsed time.

2. The data processing device having a paging function according to claim 1, wherein said measuring means performs an examination at substantially equal time intervals as to whether each of the plurality of pages has been referred to, counts the number of times in which the page has not been referred, and uses the number of times as the elapsed time.

3. The data processing device having a paging function according to claim 2, wherein each of the pages lists the number counted by said measuring means as the elapsed claim.

4. The data processing device having a paging function according to claim 3, wherein when any of the pages has been referred to, said measuring means clears the number for the page referred to.

5. The data processing device having a paging function according to claim 1, wherein said reference elapsed time determining means determines a reference elapsed time by adding a predetermined period of time to the reference lapsed time.

6. The data processing device having a paging function according to claim 1, wherein said reference elapsed time determining means determines a new reference elapsed time by subtracting a predetermined period of time from a previous reference elapsed time when it performs a comparison.

7. A data processing device having a paging function in which a main memory is divided into a plurality of page frames, a program is divided into pages, and one page is of a same size as one page frame, page-out is performed when a required page is not written into the main memory and, thereafter, page-in is performed to write a required page from an external memory to the main memory, comprising:

monitoring means for setting reference information when a page is referred to;

setting means for periodically retrieving the reference information, setting a value of zero to a counter provided for each page and canceling the reference information therein when the reference information is set and for incrementing the value of the counter by one when the reference information is not set;

determining means for determining pages to be seized in the quantity requested starting with the pages having greater counter values when there is a request for an empty page;

distribution data registration means for measuring the number of pages for each counter value and registering the number of pages in a distribution data table when said setting means performs a setting process; and object-of-seizure counter value determining means for determining a counter value as the object of seizure according to the number of pages registered in said distribution data table when there is a request for an empty page, said determining means determines pages having counter values greater than the object-of-seizure counter value determined by said object-of-seizure counter value determining means as objects of seizure.

8. The data processing device according to claim 7, wherein said object-of-seizure counter value determining means identifies the greatest counter value by adding the result which is obtained by adding the difference values between the data registered in the distribution data table and the correction data table of each same count value starting when the difference value of the counter maximum values becomes greater than the requested number of pages and determines the counter value thus identified as an object-of-seizure counter value.

9. The data processing device according to claim 7 wherein said object-of-seizure counter value determining means has a configuration wherein the maximum value of the counter values is set as the initial value of the maximum counter value to be retrieved and the value smaller by one than the object-of-seizure counter value previously determined is set as the maximum counter value to be retrieved, and repeats the process of identifying the greatest counter value by adding the result which is obtained by adding the difference values between the data registered in the distribution data table and the correction data table of each same count value starting with the difference value of the maximum counter values becomes greater than the number of pages to satisfy the request, determining the counter value to be retrieved as the object-of-seizure counter value when the counter value to be retrieved thus identified coincides with the maximum counter value to be retrieved, and determining the value greater by one than the counter value to be retrieved as the object-of-seizure counter value when they do not coincide.

10. The data processing device having a paging function according to claim 9 wherein, in determining the object-of-seizure counter value, said object-of-seizure counter value determining means uses the registered data after changing them in accordance with the previous data registered in the correction data table.

11. A data processing device having a paging function in which a main memory is divided into a plurality of page frames, a program is divided into pages, and one page is the same size as a page frame, page-out is performed when a required page is not written into the main memory and, thereafter, page-in is performed to write a required page in an external memory to the main memory comprising:

- monitoring means for setting reference information when a page is referred to;
- setting means for periodically retrieving the reference information, for setting the value of zero in a counter provided for each page and canceling the reference information when the reference information is set, and for incrementing the value of the counter by one when the reference information is not set;
- determining means for determining pages to be seized in the quantity requested starting with the pages having greater counter values when there is a request for an empty page;
- distribution data registration means for measuring and registering the number of pages for each counter value in a distribution data table when said setting means performs the setting process;
- correction data registration means for measuring the number of unseizable pages for each counter value and registering them in a correction data table when said setting means performs the setting process; and
- an object-of-seizure counter value determining section for determining a counter value as the object of seizure according to the data registered in said distribution data table and the data registered in said correction data table when there is a request for an empty page, said determining means determines pages which have counter values greater than the object-of-seizure counter value determined by said object-of-seizure counter value determining means and which are seizable.

12. The data processing device according to claim 11, wherein said correction data registration means registers a value obtained by performing a predetermined calculation on the number of unseizable pages obtained by measurement as the number of unseizable pages for each counter value to be registered in the correction data table.

13. A data processing device having a paging function in which a main memory is divided into a plurality of page frames, a program is divided into pages of which size is the same as a page frame, page-out is performed when a required page is not written in the main memory, and, thereafter, page-in is performed to write a required page in an external memory into the main memory, comprising:

- measuring means for measuring for every page stored in the main memory time elapsed since the page was last referred to;
- grouping means for grouping the pages into page groups in which each page has the same elapsed time;
- first counting means for counting a number of pages in each group of pages;
- second counting means for counting a number of pages in each group of pages;
- adding means for adding the numbers of pages counted by said first counting means from which the number of unseizable pages counted by said second counting means is subtracted for each of the groups one another, in order of decreasing the elapsed time for the group from longer elapsed time to shorter elapsed time, when a page fault occurs and some pages are requested to be paged-out;
- reference elapsed time determining means for determining a elapsed time for a group, adding of the counted number for which causes a result of the adding to exceed a number of requested pages to be paged-out, as a reference elapsed time for pages to be paged out; and
- means for comparing the elapsed time of each page with the reference elapsed time and for determining the pages in which the elapsed time is greater than the reference elapsed time.

14. A data processing means, comprising:

- measuring means for measuring elapsed times of pages comprising of obtainable and unobtainable pages stored in a main memory, from a time each of the pages was last referred to;
- grouping means for forming page groups based on same elapsed times;
- first counting means for counting a number of pages in each of the page groups;
- second counting means for counting a number of unobtainable pages in each of the page groups;
- calculating means for calculating a difference between the number of pages and the number of unobtainable pages, to decrease elapsed time of each of the page groups when a page fault occurs and some pages are requested to be paged-out;
- reference elapsed time determining means for determining a reference elapsed time for pages to be paged-out, by adding an elapsed time of each page groups to a number that would make a sum exceeding a number of requested pages to be paged-out;
- determining means for determining page groups with elapsed times greater than the reference elapsed time.

* * * * *

UNITED STATES PATENT AND TRADEMARK OFFICE
CERTIFICATE OF CORRECTION

PATENT NO.   : 5,588,135
DATED        : December 24, 1996
INVENTOR(S)  : Takehiko TANAKA It is certified that error appears in the above-indentified patent and that said Letters Patent is hereby corrected as shown below:

COL. 1,  line 12,  change "and/or," to --and/or--
COL. 2,  line 25,  change "unsynchronous" to --asynchronous--
COL. 3,  line 36,  change "object," to --object--
COL. 6,  line 42,  change "an" to --a--

Signed and Sealed this

Twenty-seventh Day of May, 1997

BRUCE LEHMAN

Attest:

Attesting Officer

Commissioner of Patents and Trademarks